United States Patent
Kuo et al.

(10) Patent No.: US 12,445,579 B2
(45) Date of Patent: Oct. 14, 2025

(54) PROJECTION DEVICE AND PROJECTION METHOD THEREOF

(71) Applicant: Coretronic Corporation, Hsin-Chu (TW)

(72) Inventors: Pen-Ning Kuo, Hsin-Chu (TW); Fu-Shan Wang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/971,649

(22) Filed: Oct. 24, 2022

(65) Prior Publication Data
US 2023/0136066 A1 May 4, 2023

(30) Foreign Application Priority Data
Oct. 29, 2021 (CN) .......................... 202111267687.1

(51) Int. Cl.
*H04N 9/31* (2006.01)
*G03B 21/14* (2006.01)

(52) U.S. Cl.
CPC ........... *H04N 9/312* (2013.01); *G03B 21/142* (2013.01)

(58) Field of Classification Search
CPC ...... H04N 9/312; H04N 9/317; H04N 9/3188; G03B 21/142
See application file for complete search history.

(56) References Cited

U.S. PATENT DOCUMENTS

| | | | | |
|---|---|---|---|---|
| 11,573,396 B2* | 2/2023 | Smith | ................. | G03B 21/008 |
| 2007/0035806 A1* | 2/2007 | O'Donnell | ........... | H04N 5/7416 |
| | | | | 348/E5.142 |
| 2016/0323549 A1* | 11/2016 | Nakajima | ............ | H04N 9/3155 |
| 2018/0013978 A1* | 1/2018 | Duan | .................... | H04N 21/47 |
| 2018/0047321 A1* | 2/2018 | Hirakura | ............. | H04N 9/3188 |
| 2018/0203335 A1* | 7/2018 | Geng | ..................... | G03B 21/145 |
| 2019/0104292 A1* | 4/2019 | Oka | ..................... | H04N 9/3185 |
| 2019/0141304 A1* | 5/2019 | Lim | ....................... | H04N 9/312 |
| 2019/0166340 A1* | 5/2019 | Chang | .................. | H04N 9/3197 |
| 2019/0227261 A1* | 7/2019 | Smith | ................ | G02B 26/0841 |
| 2020/0099900 A1* | 3/2020 | Su | ........................ | H04N 9/3188 |

(Continued)

FOREIGN PATENT DOCUMENTS

CN 110068906 7/2019

*Primary Examiner* — Ibrahim A Khan
(74) *Attorney, Agent, or Firm* — JCIPRNET

(57) ABSTRACT

A projection device and a projection method thereof are provided. The projection device includes a spatial modulator, a first optical actuator, a driving circuit, and a control circuit. The spatial modulator modulates a beam to generate an image beam. The driving circuit is coupled to the first optical actuator, determines a swinging mode of the first optical actuator according to an input video signal, and converts a display frame into sub-display frames corresponding to the swinging mode. The control circuit is coupled to the spatial modulator and the driving circuit, controls the spatial modulator to generate the image beam according to the sub-display frames, and outputs synchronization signals corresponding to the sub-display frames to the driving circuit. The driving circuit drives the first optical actuator to swing according to the synchronization signals and the swinging mode to change an optical path of the image beam to generate a projection image.

9 Claims, 7 Drawing Sheets

(56) References Cited

U.S. PATENT DOCUMENTS

| | | | |
|---|---|---|---|
| 2020/0213567 A1* | 7/2020 | Okada | H04N 9/3188 |
| 2020/0304762 A1* | 9/2020 | Nakamura | H04N 9/3161 |
| 2020/0304763 A1* | 9/2020 | Nakamura | H04N 9/3164 |
| 2020/0304765 A1* | 9/2020 | Nakamura | H04N 9/3188 |
| 2020/0363707 A1* | 11/2020 | Hirakura | G03B 21/142 |
| 2020/0371402 A1* | 11/2020 | Hirakura | G02B 26/0833 |
| 2020/0371405 A1* | 11/2020 | Yanagihara | H04N 9/3188 |
| 2021/0247671 A1* | 8/2021 | Wakabayashi | G03B 21/2066 |
| 2021/0335159 A1* | 10/2021 | Yamaguchi | G09G 3/007 |
| 2022/0132084 A1* | 4/2022 | Yanagisawa | G02B 26/0875 |
| 2022/0137493 A1 | 5/2022 | Chen et al. | |

\* cited by examiner

| Swinging mode | Input video signal | Driving circuit | Control circuit | Pixel displacement |
|---|---|---|---|---|
| 1P | WQ+@120Hz 1440p@120Hz | WQ+@120Hz 1440p@120Hz | WQ+@120Hz 1440p@120Hz | No displacement |
| 2P | 4K@60Hz | WQ+@120Hz First optical actuator activated | WQ+@120Hz | |
| 2P | 4K@60Hz | 4K@60Hz | WQ+@120Hz Second optical actuator activated | |
| 4P | 5.4K@30Hz 2880p@30Hz | WQ+@120Hz 1440p@120Hz First optical actuator activated | WQ+@120Hz 1440p@120Hz | |
| 8P | 8K@15Hz | 4K@60Hz First optical actuator activated | WQ+@120Hz Second optical actuator activated | |

FIG. 2

PROJECTION DEVICE AND PROJECTION METHOD THEREOF

CROSS-REFERENCE TO RELATED APPLICATION

This application claims the priority benefit of China application serial no. 202111267687.1, filed on Oct. 29, 2021. The entirety of the above-mentioned patent application is hereby incorporated by reference herein and made a part of this specification.

BACKGROUND

Technical Field

The disclosure relates to a display device, and in particular to a projection device and a projection method thereof.

Description of Related Art

Nowadays, if the resolution of a projector is to be increased, different actuators are often used to swing optical elements to achieve different resolutions. For example, when the resolution of an input video signal is 1080P, different resolutions, such as a resolution of 1440P or 4K, can be achieved through using different actuators. However, once the type of actuator used is determined, the control manner of the actuator is fixed and cannot be adjusted, such that the user cannot choose to project images with different resolutions.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The disclosure provides a projection device and a projection method thereof, which can increase the usage flexibility of the projection device, improve the usage convenience of the projection device, and allow the user to freely choose the resolution of a projection image.

A projection device of the disclosure includes a spatial modulator, a first optical actuator, a driving circuit, and a control circuit. The spatial modulator modulates a beam to generate an image beam. The driving circuit is coupled to the first optical actuator, determines a swinging mode of the first optical actuator according to an input video signal, and converts each display frame into multiple sub-display frames corresponding to the swinging mode of the first optical actuator. The control circuit is coupled to the spatial modulator and the driving circuit, controls the spatial modulator to generate the image beam according to the sub-display frames, and outputs a synchronization signal corresponding to each sub-display frame to the driving circuit. The driving circuit drives the first optical actuator to swing according to the synchronization signal and the swinging mode of the first optical actuator to change a optical path of the image beam to generate a projection image corresponding to a resolution of the input video signal.

In an embodiment of the disclosure, the projection device further includes a second optical actuator coupled to the driving circuit. The driving circuit further determines a swinging mode of the second optical actuator according to the input video signal. The driving circuit drives the second optical actuator to swing according to the swinging mode of the second optical actuator to change the optical path of the image beam.

In an embodiment of the disclosure, the projection device further includes a second optical actuator coupled to the control circuit. The driving circuit further determines a swinging mode of the second optical actuator according to the input video signal. The control circuit drives the second optical actuator to swing according to the swinging mode of the second optical actuator to change the optical path of the image beam.

In an embodiment of the disclosure, the control circuit further includes an extended pixel resolution circuit and a spatial modulator control circuit. The extended pixel resolution circuit is coupled to the driving circuit and the second optical actuator. The spatial modulator control circuit is coupled to the driving circuit, the extended pixel resolution circuit, and the spatial modulator, controls the spatial modulator to generate the image beam according to the sub-display frames, and provides synchronization signals corresponding to the sub-display frames to the driving circuit and the extended pixel resolution circuit. The driving circuit and the extended pixel resolution circuit respectively drive the first optical actuator and the second optical actuator to swing according to the synchronization signals to change the optical path of the image beam.

In an embodiment of the disclosure, the driving circuit determines the swinging mode of the first optical actuator according to at least one of a resolution and a frequency of the input video signal.

In an embodiment of the disclosure, the driving circuit is a field programmable gate array.

In an embodiment of the disclosure, the synchronization signal is a vertical synchronization signal.

The disclosure also provides a projection method of a projection device. The projection device includes a spatial modulator, an optical actuator, a driving circuit, and a control circuit. The control circuit controls the spatial modulator to generate an image beam. The projection method of the projection device includes the following steps. A swinging mode of the optical actuator is determined according to an input video signal. Each display frame is converted into multiple sub-display frames corresponding to the swinging mode of the optical actuator. The sub-display frames are output to the control circuit, so that the control circuit controls the spatial modulator to generate the image beam according to the sub-display frames. A synchronization signal corresponding to each of the sub-display frames is received from the control circuit. The optical actuator is driven to swing according to the synchronization signal and the swinging mode of the optical actuator to generate a projection image corresponding to a resolution of the input video signal.

Based on the above, the driving circuit of the embodiments of the disclosure may determine the swinging mode of the first optical actuator according to the input video signal, convert each display frame into multiple sub-display frames corresponding to the swinging mode of the first optical actuator, and drive the first optical actuator to swing according to the swinging mode of the optical actuator and the synchronization signals corresponding to the sub-display frames provided by the control circuit to change the optical path of the image beam to generate the projection image corresponding to the resolution of the input video signal. In this way, the swinging mode of the first optical actuator is not limited to the setting of the control circuit and the specification of the spatial modulator, which can increase the usage flexibility of the projection device, improve the usage convenience of the projection device, and allow the user to freely choose the resolution of the projection image.

Other objectives, features and advantages of the disclosure will be further understood from the further technological features disclosed by the embodiments of the disclosure wherein there are shown and described preferred embodiments of this invention, simply by way of illustration of modes best suited to carry out the invention.

In order for the features and advantages of the disclosure to be more comprehensible, specific embodiments are described in detail below in conjunction with the drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 2 is a schematic diagram of a relationship between a swinging mode, a sub-display frame, and a pixel displacement according to an embodiment of the disclosure.

DETAILED DESCRIPTION OF DISCLOSED EMBODIMENTS

Figure 1:
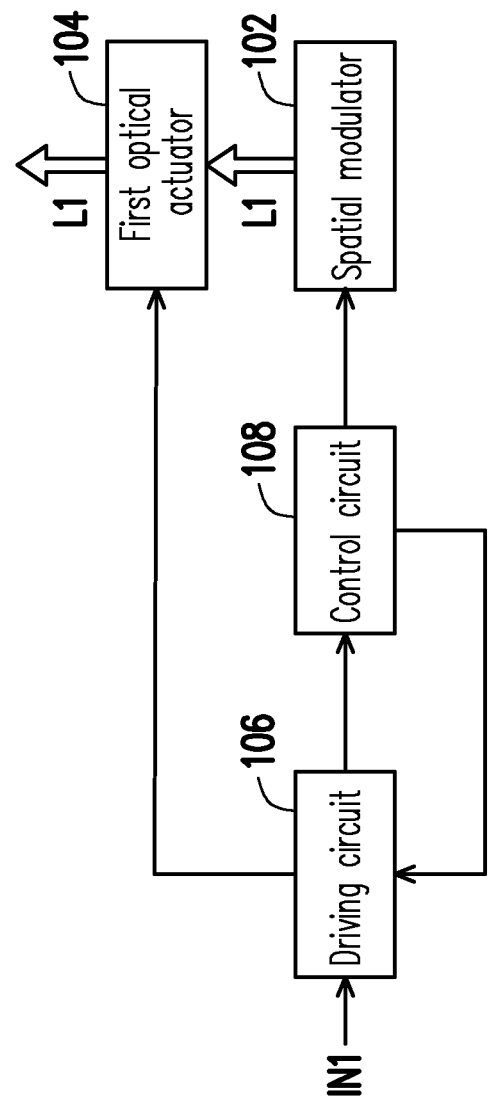
FIG. 1 is a schematic diagram of internal elements of a projection device according to an embodiment of the disclosure.

It is to be understood that other embodiment may be utilized and structural changes may be made without departing from the scope of the disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

In order for the content of the disclosure more comprehensible, the following embodiments are specifically cited as examples on which the disclosure can indeed be implemented. In addition, wherever possible, elements/components with the same reference numerals in the drawings and embodiments represent the same or similar parts. "Coupling" is defined as such that there is transmission of electrical signals between two devices or circuits, which does not necessarily need to be directly transmitted and may also be transmitted by a third device in between.

FIG. 1 is a schematic diagram of internal elements of a projection device according to an embodiment of the disclosure. Please refer to FIG. 1. The projection device includes a spatial modulator 102, a first optical actuator 104, a driving circuit 106, and a control circuit 108, wherein the control circuit 108 is coupled to the spatial modulator 102 and the driving circuit 106, and the driving circuit 106 is coupled to the first optical actuator 104.

The spatial modulator 102 may be used to modulate a beam to generate an image beam L1. The spatial modulator 102 may be, for example, a reflective optical modulator such as a liquid crystal on silicon panel (LCoS panel) and a digital micro-mirror device (DMD) or a transmissive optical modulator such as a transparent liquid crystal panel, an electro-optical modulator, a magneto-optical modulator, and an acousto-optical modulator (AOM), but not limited thereto. The image beam L1 generated by the spatial modulator 102 passes through the first optical actuator 104 to generate a projection image. A sub-display frame mentioned below represents the projection image that is projected onto a screen or a wall in a time sequence.

FIG. 2 is a schematic diagram of a relationship between a swinging mode, a sub-display frame, and a pixel displacement according to an embodiment of the disclosure. The swinging modes include 1P, 2P, 4P, and 8P, but not limited thereto. The 1P mode represents that the optical actuator is not driven, so no displacement is generated. For example, in the 1P mode, when the resolution of a display frame of an input video signal IN1 is WQXGA+(2716×1528)@120 Hz, since the resolution required by the specification of the spatial modulator 102 is met, the driving circuit 106 or the control circuit 108 does not drive the optical actuator. In the 2P mode, when the resolution of the display frame of the input video signal IN1 is 4K (3840×2160)@60 Hz, the driving circuit 106 converts the display frame of the input video signal IN1 into 2 sub-display frames, and sends the sub-display frames to the control circuit 108, wherein the resolution of each sub-display frame is WQXGA+(2716×1528), and a screen update frequency is 120 Hz. The control circuit 108 may control the spatial modulator 102 to modulate the beam according to the sub-display frame to generate the image beam L1 with a resolution of WQXGA+(2716×1528) and the screen update frequency of 120 Hz. The control circuit 108 outputs a synchronization signal corresponding to each sub-display frame to the driving circuit 106, so that the driving circuit 106 drives the first optical actuator 104 to swing according to the synchronization signal, and the first optical actuator 104 projects the 2 sub-display frames to 2 corresponding positions according to the 2P mode for the projection image to have a resolution of 4K (3840×2160)@60 Hz. In another 2P mode, when the resolution of the display frame of the input video signal IN1 is 4K (3840×2160)@60 Hz, the control circuit 108 converts the display frame of the input video signal IN1 into 2 sub-display frames, wherein the resolution of each sub-display frame is WQXGA+(2716×1528), and the screen update frequency is 120 Hz. The control circuit 108 may control the spatial modulator 102 to modulate the beam according to the sub-display frame to generate the image beam L1 with a resolution of WQXGA+(2716×1528) and the screen update frequency of 120 Hz. The control circuit 108 drives a second optical actuator 402 to swing, so that the second optical actuator 402 projects the 2 sub-display frames to 2 corresponding positions according to the 2P mode for the projection image to have a resolution of 4K (3840×2160)@60 Hz. In the 4P mode, when the resolution of the display frame of the input video signal IN1 is 5.4K (5432×3056)@30 Hz, the driving circuit 106 converts the display frame of the input video signal IN1 into 4 sub-display frames, and sends the sub-display frames to the control circuit 108, wherein the resolution of each sub-display frame is WQXGA+(2716×1528), and the screen update frequency is 120 Hz. The control circuit 108 may control the spatial modulator 102 to modulate the beam according to the sub-display frame to generate the image beam L1 with a resolution of WQXGA+(2716×1528) and the screen update frequency of 120 Hz. The control circuit 108 outputs the synchronization signal corresponding to each sub-display frame to the driving circuit 106, so that the driving circuit 106 drives the first optical actuator 104 to swing according to the synchronization signal, and the first optical actuator 104 projects the 4 sub-display frames to 4 corresponding positions according to the 4P mode for the projection image to have a resolution of 5.4K (5432×3056) @30 Hz. In the 8P mode, when the resolution of the display frame of the input video signal IN1 is 8K (7680×4320)@15 Hz, the driving circuit 106 converts the display frame of the input video signal IN1 into 6 sub-display frames, wherein 4 sub-display frames remain in the driving circuit 106 and 2 sub-display frames are sent to the control circuit 108, wherein the resolution of the 4 sub-display frames is 4K (3840×2160)@60 Hz, and the resolution of the 2 sub-display frames is WQXGA+(2716×1528)@120 Hz. The control circuit 108 may control the spatial modulator 102 to modulate the beam according to the sub-display frame to generate the image beam L1 with a resolution of WQXGA+(2716× 1528) and the screen update frequency of 120 Hz. The control circuit 108 outputs the synchronization signal corresponding to each sub-display frame to the driving circuit 106, so that the driving circuit 106 drives the first optical actuator 104 to swing according to the synchronization signal, and the first optical actuator 104 projects the 4 sub-display frames to 4 corresponding positions according to the 4P mode. In addition, the control circuit 108 drives the second optical actuator 402 to swing, so that the second optical actuator 402 projects the 2 sub-display frames to 2 corresponding positions according to the 2P mode. By means of the actuations of the first optical actuator 104 and the second optical actuator 402, the projection image can have a resolution of 8K (7680×4320)@15 Hz.

A more detailed description is as follows. Referring to FIG. 1, when the driving circuit 106 receives the input video signal IN1, wherein the input video signal IN1 includes a display frame, the driving circuit 106 may determine the swinging mode of the first optical actuator 104 according to the input video signal IN1, for example, determine the swinging mode of the first optical actuator 104 according to at least one of the resolution and the frequency of the input video signal IN1, and convert the display frame into multiple sub-display frames corresponding to the swinging mode of the first optical actuator 104. The driving circuit 106 may be implemented by, for example, a field programmable gate array (FPGA). In addition, the control circuit 108 receives the sub-display frames generated by the driving circuit 106. According to the sub-display frames generated by the driving circuit 106, the control circuit 108 may control the spatial modulator 102 to generate the image beam L1, and the control circuit 108 outputs the synchronization signal corresponding to each sub-display frame to the driving circuit 106, wherein the synchronization signal may be, for example, a vertical synchronization signal commonly used in the art, but not limited thereto. The control circuit 108 may be implemented by, for example, a DDP442x chip manufactured by Texas Instruments, but not limited thereto. The driving circuit 106 may drive the first optical actuator 104 to swing according to the synchronization signal and the swinging mode of the first optical actuator 104 to change an optical path of the image beam L1 to generate the projection image corresponding to the resolution of the input video signal IN1. In this way, the swinging mode of the first optical actuator 104 is determined corresponding to the input video signal IN1 with different specifications, so that the swinging mode of the first optical actuator 104 is not limited to the setting of the control circuit 108 or the specification of the spatial modulator 102 to increase the usage flexibility of the projection device, improve the usage convenience of the projection device, and allow the user to freely choose the resolution of the projection image.

Furthermore, the first optical actuator 104 includes a transparent element and a swinging device (not shown). The transparent element is used to allow the image beam L1 to penetrate, and the transparent element swings in a time sequence by the swinging device to change the optical path of the image beam L1. The swinging mode of the first optical actuator 104 may include, for example, a first swinging mode and a second swinging mode. For example, in the first swinging mode, the driving circuit 106 converts the display frame into 2 sub-display frames. The control circuit 108 receives the 2 sub-display frames, generates synchronization signals corresponding to the 2 sub-display frames, and transmits the synchronization signals to the driving circuit 106. The driving circuit 106 drives the first optical actuator 104 to swing according to the synchronization signals provided by the control circuit 108 to project the 2 sub-display frames to 2 corresponding positions, wherein a distance between the 2 positions is, for example, half of a diagonal distance of a pixel. In addition, for example, in the second swinging mode, the driving circuit 106 converts the display frame into 4 sub-display frames, and the driving circuit 106 drives the first optical actuator 104 to swing according to the synchronization signals provided by the control circuit 108 to project the 4 sub-display frames to 4 corresponding positions, wherein a distance between 2 adjacent positions is, for example, half of a length distance of a pixel.

For example, the maximum resolution supported by the control circuit 108 and the spatial modulator 102 is WQXGA+(2716×1528), and the input video signal IN1 is a 5.4K@30 Hz video signal (that is, a video signal with a resolution of (5432×3056) and a screen update frequency of 30 Hz). The driving circuit 106 receives the input video signal IN1. The driving circuit 106 may determine the swinging mode of the first optical actuator 104 as a mode of shifting pixels of the sub-display frame to 4 different positions according to the resolution and the screen update frequency of the input video signal IN1, which is the second swinging mode (the 4 positions (4P) mode as shown in FIG. 2). In detail, the driving circuit 106 may convert the display frame of the video signal IN1 into 4 sub-display frames, and send the sub-display frames to the control circuit 108, wherein the resolution of each sub-display frame is WQXGA+(2716×1528), and the screen update frequency is 120 Hz. The control circuit 108 may control the spatial modulator 102 to modulate the beam according to the resolution of the sub-display frame and the image update frequency to generate the image beam L1 with the resolution of WQXGA+(2716×1528) and the image update frequency of 120 Hz. At the same time, the control circuit 108 outputs the synchronization signal corresponding to each sub-display frame to the driving circuit 106, so that the driving circuit 106 drives the first optical actuator 104 to swing according to the synchronization signal corresponding to each sub-display frame. For each sub-display frame, the first optical actuator 104 projects the 4 sub-display frames to 4 corresponding positions according to the swinging mode (the 4P mode) determined by the driving circuit 106. As shown in FIG. 2, taking 4 pixel positions representing the movement of the 4 sub-display frames as an example, in the 4P mode, after the image beam L1 passes through the swinging first optical actuator 104, the optical path is changed, so that 4 pixels corresponding to the 4 sub-display frames are shifted to 4 different positions 1 to 4, wherein a time point at which the 4 pixels are sequentially projected to the 4 corresponding positions 1 to 4 may be determined by 4 synchronization signals provided by the control circuit 108. Each synchronization signal may be, for example, the vertical synchronization signal of each sub-display frame, but not limited thereto. In the embodiment, a pixel displacement pitch between adjacent pixels is D/2, that is, the relative displacement pitch between the 4 sub-display frames is D/2, where D is a length between pixels. The 4 sub-display frames after pixel displacement enable the viewer to view with increased number of pixels (increased resolution) and smooth image edges, so that the resolution of the projection image can reach the resolution of the input video signal IN1 (5432×3056). Similarly, the input video signal IN1 with a resolution and an image update frequency of 2880P@30 Hz also enables the first optical actuator 104 to swing in the 4P mode, so that the projection device can provide the 2880P@30 Hz projection image.

For another example, when the resolution and the image update frequency of the input video signal IN1 is 4K (3840×2160)@60 Hz, the driving circuit 106 may determine the swinging mode of the optical actuator 104 as a mode of shifting each pixel of the display frame to 2 different positions, that is, the first swinging mode (the 2P mode as shown in FIG. 2) according to the resolution and the image update frequency of the input video signal IN1. In detail, the driving circuit 106 may convert the display frame into 2 sub-display frames, and send the sub-display frames to the control circuit 108, wherein the resolution of each sub-display frame is WQXGA+(2716×1528), and the screen update frequency is 120 Hz. Similarly, the control circuit 108 may control the spatial modulator 102 to modulate the beam according to the sub-display frame to generate the image beam L1, and output the synchronization signal corresponding to each sub-display frame to the driving circuit 106, so that the driving circuit 106 drives the first optical actuator 104 to swing according to the synchronization signal, and the first optical actuator 104 projects the 2 sub-display frames to 2 corresponding positions according to the 2P mode. As shown in FIG. 2, in the 2P mode, after the image beam L1 passes through the swinging first optical actuator 104, 2 corresponding pixels in the 2 sub-display frames are shifted to 2 different positions 1 and 2, and the 2 shifted sub-display frames enable the viewer to view the 4K (3840×2160)@60 Hz projection image. It is worth noting that in some embodiments, the control circuit 108 may also convert the display frame into the 2 sub-display frames, and drive the second optical actuator 402 to swing, so that the second optical actuator 402 projects the 2 sub-display frames to the 2 corresponding positions according to the 2P mode. It is not limited that the driving circuit 106 must convert the display frame into the 2 sub-display frames.

In addition, when the resolution and the image update frequency of the input video signal IN1 is WQXGA+(2716×1528)@120 Hz or 1440P@120 Hz, since the specification of the video signal IN1 is a specification that may be supported by the control circuit 108 and the spatial modulator 102, the first optical actuator 104 does not need to swing, and the image beam L1 generated by the spatial modulator 102 may be directly projected, as shown in the 1P mode in FIG. 2.

It is worth noting that the swinging mode of the first optical actuator 104 is not limited to the above embodiments. In other embodiments, the driving circuit 106 may convert the display frame into more sub-display frames (for example, 8 sub-display frames, but not limited thereto) according to the input video signal IN1, and drive the first optical actuator 104 to swing according to the synchronization signals provided by the control circuit 108 and the swinging mode of the first optical actuator 104 to project the sub-display frames to corresponding positions (for example, project the 8 sub-display frames to 8 corresponding positions) to generate the projection image corresponding to the resolution of the input video signal IN1. The first optical actuator 104 may generate multiple swinging modes in a single-axis and a multi-axis manner.

Figure 3:
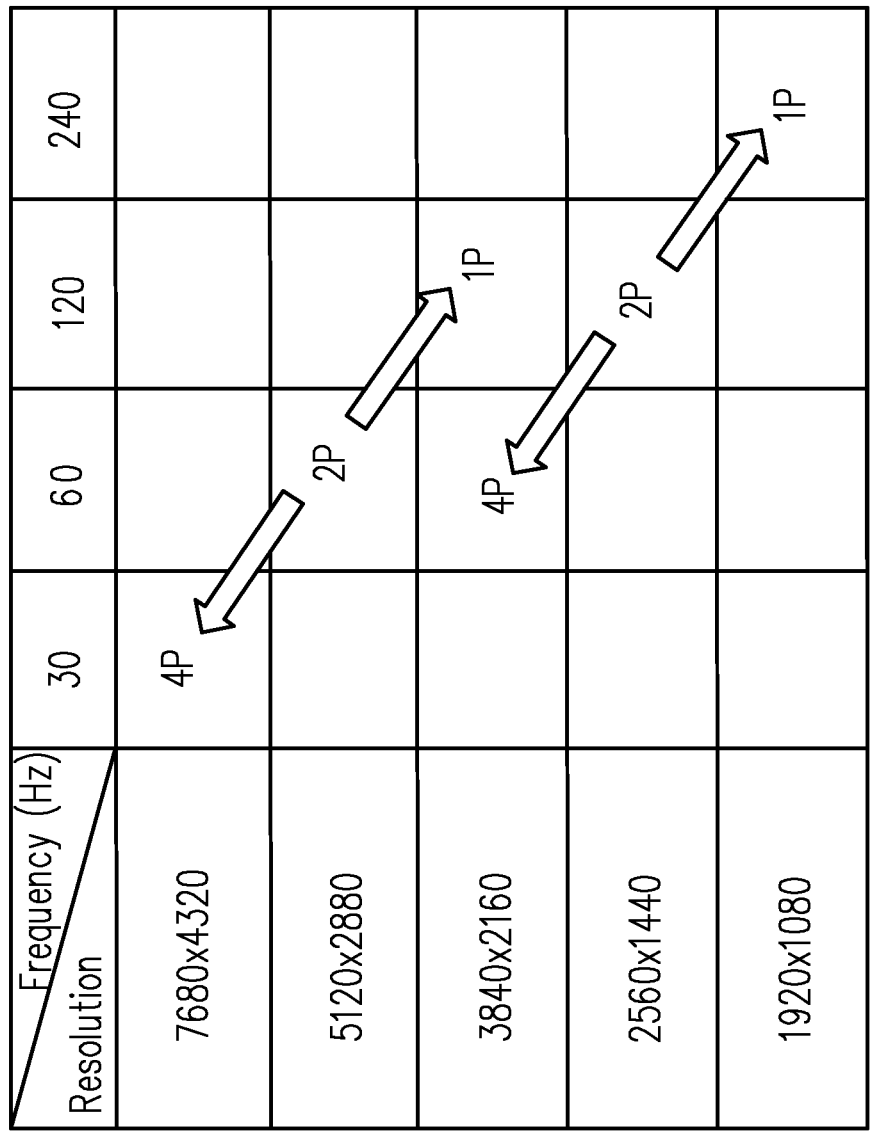
FIG. 3 is a schematic diagram of a corresponding relationship between a swinging mode and a resolution and a frequency according to an embodiment of the disclosure.

It can be seen from the above embodiments that the driving circuit 106 determines the swinging mode of the first optical actuator 104 according to the input video signal IN1, and drives the first optical actuator 104 to swing according to the swinging mode of the first optical actuator 104 and the synchronization signal corresponding to the sub-display frame provided by the control circuit 108 to generate the projection image corresponding to the resolution of the input video signal IN1, and the swinging mode of the first optical actuator 104 is not limited to the setting of the control circuit 108 and the specification of the spatial modulator 102, thereby increasing the usage flexibility of the projection device, improving the usage convenience of the projection device, and allowing the user to freely choose the resolution of the projection image. For example, FIG. 3 is a schematic diagram of a corresponding relationship between a swinging mode and a resolution and a frequency according to an embodiment of the disclosure. As shown in FIG. 3, for example, in a case where the maximum video signal specification supported by the control circuit 108 and the spatial modulator 102 is a resolution of 1080p(1920×1080), the driving circuit 106 controls the first optical actuator 104 to swing, so that the projection image projected by the projection device has a resolution of 2560×1440 and the screen update frequency of 120 Hz (in the 2P mode) or a resolution of 3840×2160 and a screen update frequency of 60 Hz (in the 4P mode). For another example, when the maximum video signal specification supported by the control circuit 108 and the spatial modulator 102 is a resolution of 3840×2160, the driving circuit 106 controls the first optical actuator 104 to swing, so that the projection image projected by the projection device has a resolution of 5120×2880 and the screen update frequency of 60 Hz (in the 2P mode) or a resolution of 7680×4320 and the screen update frequency of 30 Hz (in the 4P mode).

Figure 4A:
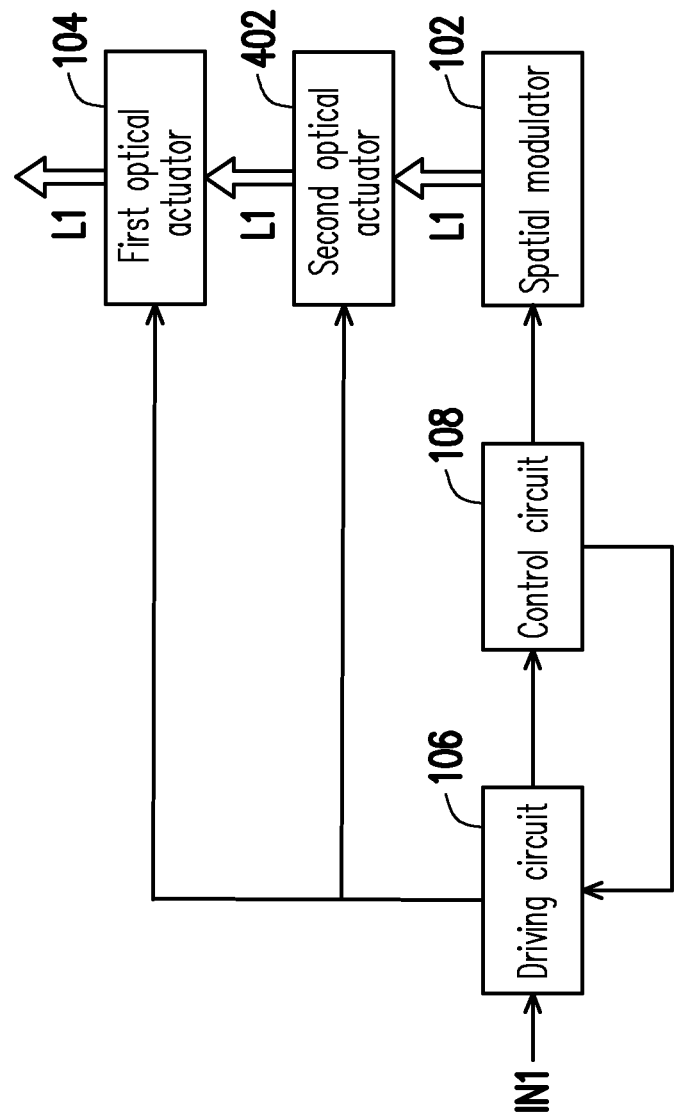
FIG. 4A is a schematic diagram of a projection device according to another embodiment of the disclosure.

FIG. 4A is a schematic diagram of a projection device according to another embodiment of the disclosure. In the embodiment, the projection device may further include the second optical actuator 402, which is coupled to the driving circuit 106. The swinging mode of the second optical actuator 402 may be determined by the driving circuit 106 according to the input video signal IN1. The control circuit 108 may drive the second optical actuator 402 to swing according to the swinging mode of the second optical actuator 402 determined by the driving circuit 106. The driving circuit 106 generates multiple sub-display frames. The control circuit 108 receives the sub-display frames generated by the driving circuit 106. According to the sub-display frames generated by the driving circuit 106, the control circuit 108 may control the spatial modulator 102 to generate the image beam L1, and the control circuit 108 outputs the synchronization signal corresponding to each sub-display frame to the driving circuit 106. The driving circuit 106 may respectively drive the first optical actuator 104 to swing according to the synchronization signal, the swinging mode of the first optical actuator 104, and the swinging mode of the second optical actuator 402 to change the optical path of the image beam L1, and drive the second optical actuator 402 to swing to change the optical path of the image beam L1 to generate the projection image corresponding to the resolution of the input video signal IN1. It is worth mentioning that the image beam L1 emitted from the spatial modulator 102 sequentially passes through the second optical actuator 402 and the first optical actuator 104, so that the image beam L1 may form the projection image corresponding to the resolution of the input video signal IN1.

Furthermore, the display frame of the input video signal IN1 is converted by the driving circuit 106 into 4 first sub-display frames and 2 second sub-display frames. The control circuit 108 receives the 4 first sub-display frames and the 2 second sub-display frames from the driving circuit 106. The control circuit 108 forms synchronization signals to be provided to the driving circuit 106 according to the 4 first sub-display frames and the 2 second sub-display frames. The driving circuit 106 may drive the first optical actuator 104 to swing according to the synchronization signal corresponding to each first sub-display frame provided by the control circuit 108. At the same time, the driving circuit 106 may drive the second optical actuator 402 to swing according to the synchronization signal corresponding to each second sub-display frame provided by the control circuit 108. When the input video signal IN1 is 8K(7680×4320)@15 Hz, the driving circuit 106 drives the first optical actuator 104 to swing (in the 4P mode) according to the synchronization signals corresponding to the first sub-display frames provided by the control circuit 108. At the same time, The driving circuit 106 drives the second optical actuator 402 to swing (in the 2P mode) according to the synchronization signals corresponding to the second sub-display frames provided by the control circuit 108. In this way, the first optical actuator 104 and the second optical actuator 402 swing in coordination with each other. The optical path of the image beam L1 is changed by the first optical actuator 104 and the second optical actuator 402, and 8 sub-display frames are projected to 8 corresponding positions. As shown in FIG. 2, taking 8 pixels corresponding to the 8 sub-display frames as an example, in the 8P mode, after the image beam L1 sequentially passes through the swinging second optical actuator 402 and first optical actuator 104, the optical path is sequentially changed, so that positions of the pixels are shifted to 8 different positions 1 to 8, wherein a time sequence of sequentially projecting the 8 pixels to the 8 corresponding positions 1 to 8 may be determined by the synchronization signals provided by the control circuit 108. Each synchronization signal may be, for example, the vertical synchronization signal of each sub-display frame, but not limited thereto.

Figure 4B:
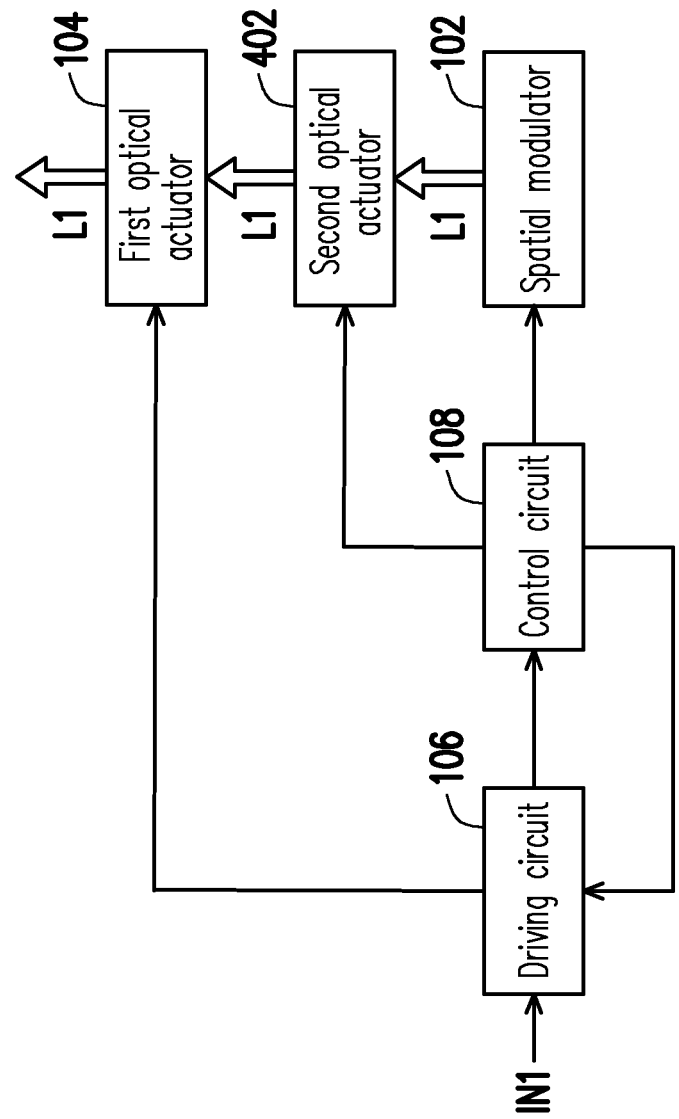
FIG. 4B is a schematic diagram of a projection device according to another embodiment of the disclosure.

FIG. 4B is a schematic diagram of a projection device according to another embodiment of the disclosure. In the embodiment, the second optical actuator 402 of the projection device is coupled to the control circuit 108. The swinging mode of the second optical actuator 402 may be determined by the driving circuit 106 according to the input video signal IN1. The control circuit 108 may drive the second optical actuator 402 to swing according to the swinging mode of the second optical actuator 402 determined by the driving circuit 106.

Furthermore, the display frame of the input video signal IN1 is converted into 4 first sub-display frames by the driving circuit 106 and converted into 2 second sub-display frames by the control circuit 108. The driving circuit 106 provides the 4 first sub-display frames to the control circuit 108. The driving circuit 106 may drive the first optical actuator 104 to swing according to the synchronization signal corresponding to each first sub-display frame provided by the control circuit 108. The control circuit 108 may drive the second optical actuator 402 to swing according to each second sub-display frame to project the 6 sub-display frames (the 4 first sub-display frames and the 2 second sub-display frames) to 8 corresponding positions. Taking the 8P mode of the embodiment in FIG. 2 as an example, when the input video signal IN1 is 8K@15 Hz, the driving circuit 106 may convert the display frame into the 4 first sub-display frames, wherein the resolution of each first sub-display frame is 4K, and the screen update frequency is 60 HZ. The control circuit 108 converts the display frame into the 2 second sub-display frames (wherein the resolution of each second sub-display frame is WQXGA+(2716×1528), and the screen update frequency is 120 HZ), and transmits the synchronization signal corresponding to each first sub-display frame to the driving circuit 106, so that the driving circuit 106 drives the first optical actuator 104 to swing (in the 4P mode) according to the synchronization signals provided by the control circuit 108. In addition, the control circuit 108 also controls the second optical actuator 402 to swing (in the 2P mode) according to the synchronization signals (such as the vertical synchronization signals) of the second sub-display frames. In this way, the first optical actuator 104 and the second optical actuator 402 swing in coordination with each other. The optical path of the image beam L1 is changed by the first optical actuator 104 and the second optical actuator 402, and the image beam L1 is projected to the 8 corresponding positions. As shown in FIG. 2, taking 8 pixels corresponding to 8 sub-display frames as an example, in the 8P mode, the image beam L1 sequentially passes through the swinging second optical actuator 402 and first optical actuator 104, and the optical path is sequentially changed, so that positions of the pixels are shifted to 8 different positions 1 to 8, wherein a time sequence of sequentially projecting the 8 pixels to the 8 corresponding positions 1 to 8 may be determined by the synchronization signals provided by the control circuit 108. Each synchronization signal may be, for example, the vertical synchronization signal of each sub-display frame, but not limited thereto.

Figure 5:
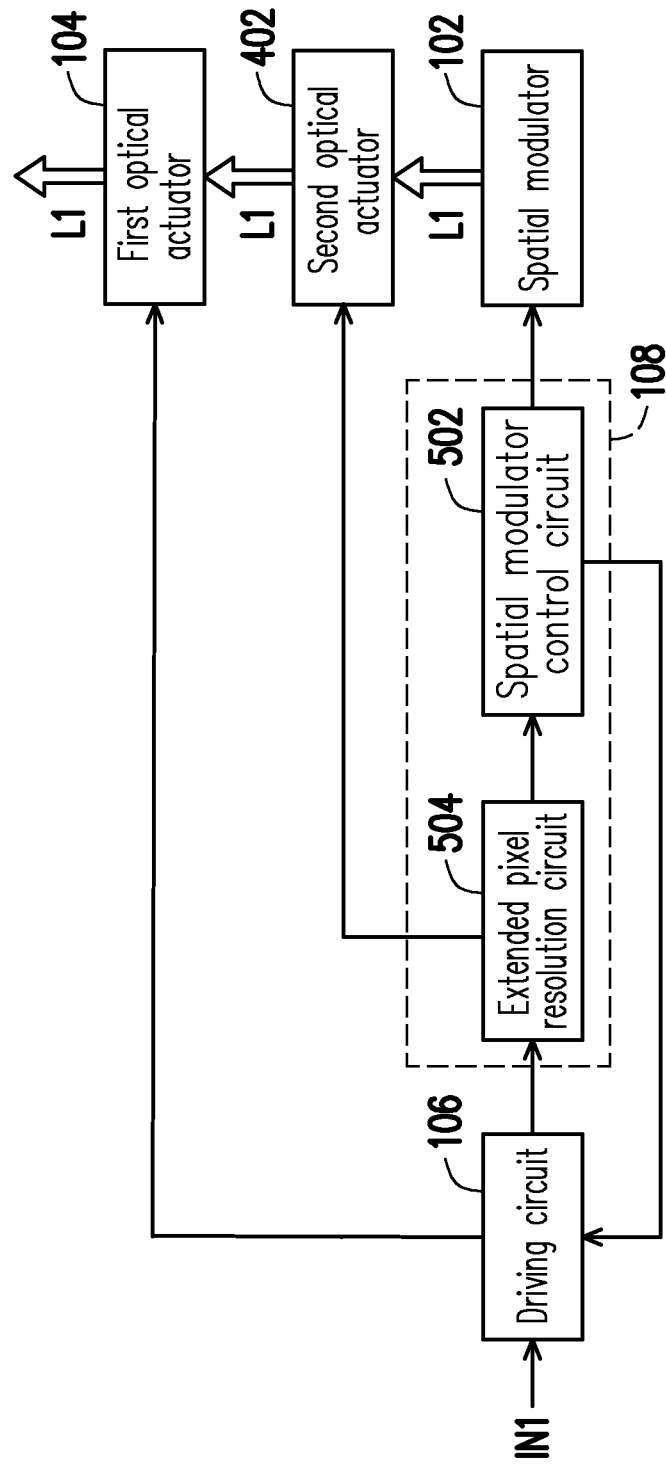
FIG. 5 is a schematic diagram of a projection device according to another embodiment of the disclosure.

FIG. 5 is a schematic diagram of a projection device according to another embodiment of the disclosure. In the embodiment, the control circuit 108 may include a spatial modulator control circuit 502 and an extended pixel resolution circuit 504, wherein the spatial modulator control circuit 502 is coupled to the spatial modulator 102, the extended pixel resolution circuit 504, and the driving circuit 106, and the extended pixel resolution circuit 504 is coupled to the driving circuit 106 and the second optical actuator 402. The extended pixel resolution circuit 504 is used to convert the display frame into each second sub-display frame. The spatial modulator control circuit 502 may control the spatial modulator 102 to generate the image beam L1. The driving circuit 106 and the extended pixel resolution circuit 504 respectively drive the first optical actuator 104 and the second optical actuator 402 to swing to change the optical path of the image beam L1, so that the projection device provides the projection image corresponding to the resolution of the input video signal IN1.

Figure 6:
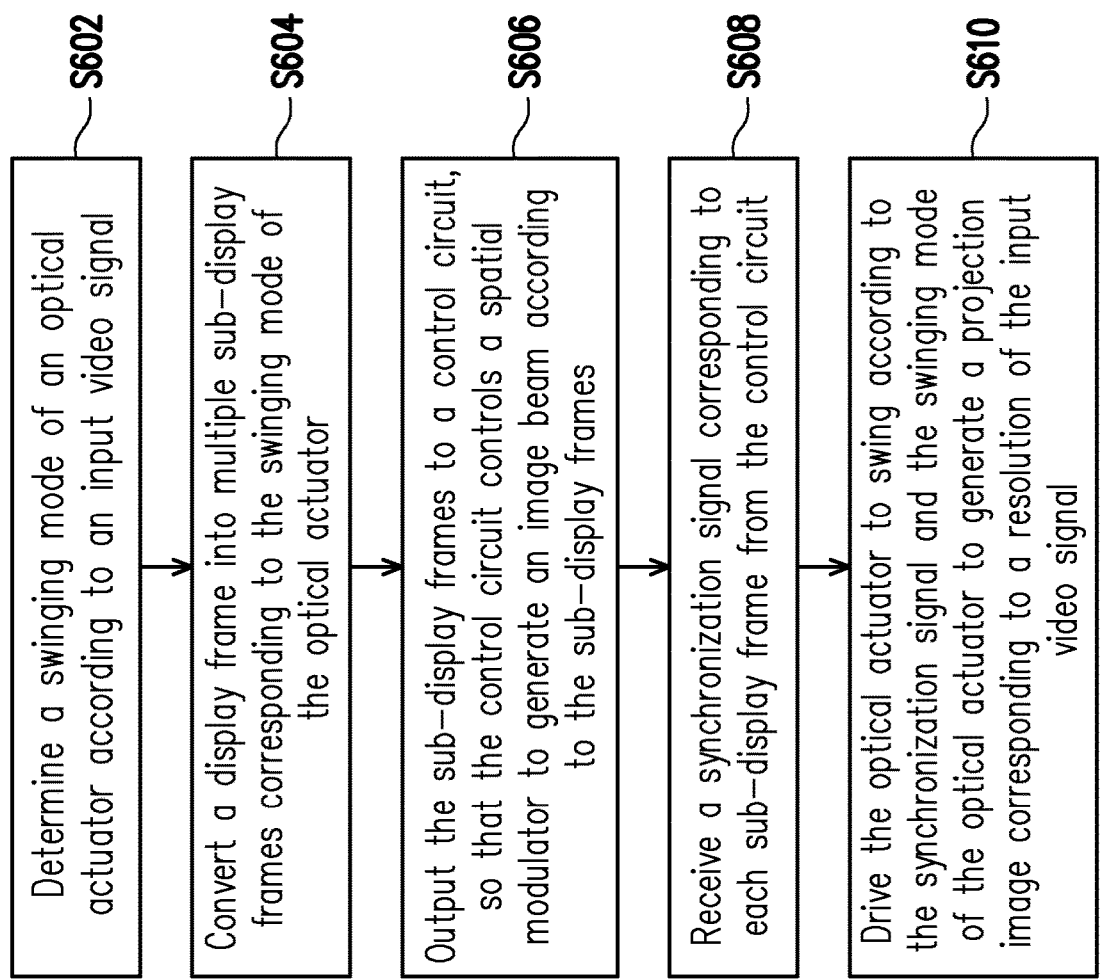
FIG. 6 is a flowchart of a projection method of a projection device according to an embodiment of the disclosure.

FIG. 6 is a flowchart of a projection method of a projection device according to an embodiment of the disclosure. The projection device includes a spatial modulator, an optical actuator, a driving circuit, and a control circuit. The control circuit is used to control the spatial modulator to generate an image beam. It can be seen from the above embodiments that the projection method of the projection device may include the following steps. First, the driving circuit determines a swinging mode of the optical actuator according to an input video signal (Step S602), for example, determines the swinging mode of the optical actuator according to at least one of a resolution and a frequency of the input video signal. Next, a display frame is converted into multiple sub-display frames corresponding to the swinging mode of the optical actuator (Step S604). For example, the swinging mode of the optical actuator may include a first swinging mode and a second swinging mode. In the first swinging mode, the optical actuator is driven to swing according to synchronization signals corresponding to the sub-display frames, and the sub-display frames are projected to corresponding positions. In the second swinging mode, the optical actuator is driven to swing according to the synchronization signals corresponding to the sub-display frames to project the sub-display frames to the corresponding positions. The sub-display frames are output to the control circuit, so that the control circuit controls the spatial modulator to generate the image beam according to the sub-display frames (Step S606). Then, the driving circuit receives the synchronization signal corresponding to each sub-display frame from the control circuit (Step S608), wherein the synchronization signal may be, for example, a vertical synchronization signal. Finally, the optical actuator is driven to swing according to the synchronization signals and the swinging mode of the optical actuator to generate a projection image corresponding to the resolution of the input video signal (Step S610).

In summary, the driving circuit of the embodiments of the disclosure may determine the swinging mode of the first optical actuator according to the input video signal, convert each display frame into multiple sub-display frames corresponding to the swinging mode of the first optical actuator, and drive the first optical actuator to swing according to the swinging mode of the optical actuator and the synchronization signals corresponding to the sub-display frames provided by the control circuit to change the optical path of the image beam to generate the projection image corresponding to the resolution of the input video signal. In this way, the swinging mode of the first optical actuator is not limited to the setting of the control circuit and the specification of the spatial modulator, which can increase the usage flexibility of the projection device, improve the usage convenience of the projection device, and allow the user to freely choose the resolution of the projection image.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the disclosure" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the disclosure as defined by the following claims. Moreover, no element and component in the disclosure is intended to be dedicated to the public regardless of whether the element or component is explicitly recited in the following claims.

What is claimed is:

1. A projection device, comprising: a spatial modulator, a first optical actuator, a second optical actuator, a driving circuit, and a control circuit; wherein the spatial modulator is configured to modulate a beam to generate an image beam;

each of the first optical actuator and the second optical actuator has a plurality of modes, and the plurality of modes of the first actuator comprises a plurality of swinging modes and a non-driven mode, the plurality of modes of the second actuator comprises a first swinging mode and the non-driven mode;

the driving circuit is configured to receive an input video signal not from the control circuit, wherein the input video signal comprises a display frame, the driving circuit is coupled to the first optical actuator and the control circuit, and is configured to determine one of the plurality of modes of the first optical actuator and one of the plurality of modes of the second optical actuator according to the input video signal, wherein, the driving circuit is configured to convert the display frame of the input video signal into a plurality of sub-display frames corresponding to the determined mode of the first optical actuator and the determined mode of the second optical actuator, wherein each of the sub-display frames has a screen update frequency higher than a screen update frequency of the display frame, and the driving circuit is configured to send the sub-display frames to the control circuit, wherein the first optical actuator is configured to generate the plurality of swinging modes in a single-axis and a multi-axis manner respectively, wherein the driving circuit is a field programmable gate array; and the control circuit is coupled to the spatial modulator and the second optical actuator respectively, wherein the control circuit is configured to control the spatial modulator to generate the image beam according to the sub-display frames that the control circuit receives from the driving circuit, and output synchronization signals corresponding to the sub-display frames to the driving circuit, wherein when a resolution of the input video signal does not meet a maximum resolution supported by the control circuit and the spatial modulator:

the determined mode of the first optical actuator is one of the plurality of the swing modes, the first optical actuator is driven by the driving circuit to swing according to the synchronization signals and the determined mode of the first optical actuator;

the determined mode of the second optical actuator is the non-driven mode or the first swing mode, the second optical actuator is driven by the control circuit to swing according to the synchronization signals and the first swing mode, so as to change an optical path of the image beam to generate a projection image corresponding to the resolution of the input video signal, wherein the driving circuit supports the plurality of the swinging modes of the first optical actuator in the single-axis and the multi-axis manner, and the control circuit only supports the first swinging mode of the second optical actuator in the single-axis manner.

2. The projection device according to claim 1, wherein the control circuit further comprises an extended pixel resolution circuit and a spatial modulator control circuit, wherein:

the extended pixel resolution circuit is coupled to the driving circuit and the second optical actuator; and the spatial modulator control circuit is coupled to the driving circuit, the extended pixel resolution circuit, and the spatial modulator, configured to control the spatial modulator to generate the image beam according to the sub-display frames, and provide the synchronization signals corresponding to the sub-display frames to the driving circuit and the extended pixel resolution circuit, wherein the driving circuit and the extended pixel resolution circuit are configured to respectively drive the first optical actuator and the second optical actuator to swing according to the synchronization signals to change the optical path of the image beam.

3. The projection device according to claim 1, wherein the driving circuit is configured to determine the one of the plurality of modes of the first optical actuator according to at least one of the resolution and a frequency of the input video signal.

4. The projection device according to claim 1, wherein the synchronization signal is a vertical synchronization signal.

5. The projection device according to claim 1, wherein the control circuit is not used to control the first optical actuator.

6. A projection method of a projection device, the projection device comprising a spatial modulator, a first optical actuator, a second optical actuator, a driving circuit, and a control circuit, each of the first optical actuator and the second optical actuator having a plurality of modes, the plurality of modes of the first optical actuator comprising a plurality of swinging modes and a non-driven mode, the plurality of modes of the second actuator comprising a first swinging mode and the non-driven mode, and the control circuit controlling the spatial modulator to generate an image beam, comprising:

determining one of the plurality of modes of the first optical actuator and one of the plurality of modes of the second optical actuator according to an input video signal not from the control circuit, wherein the input video signal comprises a display frame;

converting the display frame into a plurality of sub-display frames by the driving circuit corresponding to the determined mode of the first optical actuator and the determined mode of the second optical actuator, wherein the first optical actuator is configured to generate the plurality of swinging modes in a single-axis and a multi-axis manner respectively, wherein each of the sub-display frames has a screen update frequency higher than a screen update frequency of the display frame;

outputting the sub-display frames to the control circuit from the driving circuit, so that the control circuit controls the spatial modulator to generate the image beam according to the sub-display frames;

receiving a synchronization signal corresponding to each of the sub-display frames from the control circuit; and generating a projection image corresponding to a resolution of the input video signal, wherein when the resolution of the input video signal does not meet a maximum resolution supported by the control circuit and the spatial modulator, the projection method further comprises:

driving the second optical actuator to swing by the control circuit according to the synchronization signal and the determined mode of the second optical actuator if the determined mode of the second optical actuator is the first swing mode, or configuring the second optical actuator in the non-driven mode, wherein the driving circuit supports the plurality of the swinging modes of the first optical actuator in the single-axis and the multi-axis manner, and the control circuit only supports the first swinging mode of the second optical actuator in the single-axis manner.

7. The projection method of the projection device according to claim 6, wherein the driving circuit determines the one of the plurality of modes of the optical actuator according to at least one of the resolution and a frequency of the input video signal.

8. The projection method of the projection device according to claim 6, wherein the synchronization signal is a vertical synchronization signal.

9. The projection method of the projection device according to claim 6, wherein the control circuit does not control the first optical actuator.

* * * * *